United States Patent [19]

Martin

[11] 4,079,665
[45] Mar. 21, 1978

[54] WALL MOUNTED VENTILATOR

[76] Inventor: Stanley Irvin Martin, R. R. No. 6, Strathroy, Ontario, Canada

[21] Appl. No.: 704,021

[22] Filed: Jul. 9, 1976

[51] Int. Cl.² ............................................. F24F 13/00
[52] U.S. Cl. ................................. 98/33 R; 98/33 A; 415/149 R; 153 A
[58] Field of Search ................ 98/33 R, 33 A, 32, 29, 98/8, 9, 10; 119/16; 417/62; 415/153 A, 48, 149 R

[56] References Cited

U.S. PATENT DOCUMENTS

| | | | |
|---|---|---|---|
| 3,116,011 | 12/1963 | Laing | 415/149 R |
| 3,302,548 | 2/1967 | Kohlmeyer | 98/33 R |
| 3,363,531 | 1/1968 | Kohlmeyer et al. | 98/33 R |
| 3,367,258 | 2/1968 | Erfeling | 98/33 R |
| 3,726,308 | 4/1973 | Eberhardt | 415/153 A |
| 4,002,109 | 1/1977 | Hori et al. | 98/33 A |

*Primary Examiner*—John J. Camby
*Assistant Examiner*—Henry C. Yuen

[57] ABSTRACT

A ventilator adapted for wall mounting use in ventilating buildings such as agricultural buildings and the like used for housing livestock, and having inlet and exhaust duct means, located one above the other, and adapted to be mounted in the wall of the barn so as to provide for horizontal transfer of air into and out of the barn, inlet and exhaust fan means, the inlet fan means being located in the inlet duct and the exhaust fan means being located in the exhaust duct, operable simultaneously to blow air in their respective directions in and out of the barn, opening means extending between said inlet and exhaust ducts for transferring air from the exhaust duct back into the inlet duct, and movable air transfer duct means mounted between said inlet and exhaust ducts, and movable in said opening means between a fresh air intake position corresponding to substantially no transfer of air between the two said ducts, and an exhaust air recycle position corresponding to substantially total transfer of exhaust air back into the inlet duct, and power operated means for moving said air transfer duct means between said two positions, and thermo-sensitive means for controlling said power operated means to move said air transfer duct means into any desired position.

5 Claims, 6 Drawing Figures

WALL MOUNTED VENTILATOR

The present invention relates to a ventilator for agricultural buildings, and in particular to a ventilator for agricultural buildings housing livestock.

BACKGROUND OF THE INVENTION

When feeding livestock for market, it is the usual practise to keep them in agricultural buildings, barns and the like and feed them carefully controlled rations. In this way, the period of time required to bring them up to market weight is reduced, and labour requirements are minimized.

However, the presence of a large number of livestock in a confined space such as a barn creates problems of heating and cooling the interior of the barn, and of providing fresh air and good ventilation. If livestock do not have adequate fresh air they will become sickened. Similarly, if the temperature varies rapidly then will also suffer. In either case, losses will result either from sickness of death of animals, and further losses will result due to an increase in the time required to bring them up to market weight.

Various systems have been proposed for ventilating barns. Obviously, all such systems should remove a certain proportion of the air present in the barn, and introduce a certain proportion of fresh air into the barn which is then circulated throughout the space occupied by the livestock. It is not merely sufficient to introduce fresh air and to remove stale air. This may leave substantial pockets of stale or stagnant air which are not subject to circulation. Undoubtedly, a perfectly adequate circulation and ventilation could be obtained using modern sophisticated air conditioning techniques. However, the cost of such highly engineered air circulation systems is so great as to render them impractical for the purpose of ventilating a barn. It must particularly be borne in mind that the requirement for improved air circulation will frequently be at its greatest in existing buildings which may have been of inferior or older construction. Accordingly, any system, which is to be acceptable to the great majority of farmers and livestock breeders, must be economically priced, and effective in use both in summer and winter, and adaptable for installation in older buildings without any major modifications being required.

One of the more recent systems that have been proposed is disclosed in U.S. Letters Pat. No. 3,367,258, and a very similar system is proposed in U.S. Letters Pat. No. 3,363,531. In both of these systems, a single housing containing both a fresh air intake duct and a stale air exhaust duct is adapted to be mounted in the wall of a barn. A single fan operating in the exhaust duct draws air from the barn. The exhausing of air from the barn is intended to cause some fresh air to be drawn in through the intake duct. A double bladed damper may be moved so as to block off part of the air flowing out of the exhaust duct and redirect it into the intake duct. By varying the angle of the double bladed damper, more or less air may be redirected from the exhaust back into the intake duct. As more stale air is redirected from the exhaust and thus returned into the inlet duct, less fresh air is drawn into the into the inlet duct.

This system however suffers from a variety of disadvantages. In the first place, it does not provide for effective distribution of fresh air or recycled air into the interior of the barn. There will thus result a fairly rapid movement of air adjacent to the ventilator installation itself, and leaving a stagnant area of uncirculated air in the center of the barn. One of the results which has been frequently observed is that animals will then tend to stand as close as possible to the ventilator, leaving the other areas of the barn unoccupied. Animals in such close confinement may thus become subject to stress and injure each other. In addition, animal dung will accumulate in large quantities adjacent to the ventilator, and will have to be cleared away more frequently than would be the case if it were evenly distributed over the barn.

A further disadvantage is that the redirecting of air from the exhaust duct into the intake duct requires the air to change direction 180°. This produces severe turbulance thereby greatly reducing the operating efficiency of the ventilator. When operating in the fully open condition ie., with the maximum air being exhausted and the maximum fresh air being drawn in, then an area of turbulance is likely to arise between the two air streams flowing in opposite directions at the exterior of the ventilator.

All of these factors make it difficult to achieve a precise adjustment between the incoming fresh air and the out going stale air so that fairly wide fluctuations in temperatures can take place as a result of only minor variations in the position of the two bladed damper, and the degree of control available is thus somewhat imprecise.

BRIEF SUMMARY OF THE INVENTION

It is therefore an objective of the present invention to provide a ventilator overcoming as far as possible the foregoing disadvantages by the provision of inlet and exhaust duct means, located one above the other, and adapted to be mounted in the wall of the barn so as to provide for horizontal transfer of air into and out of the barn, inlet and exhaust fan means, the inlet fan means being located in the inlet duct and the exhaust fan means being located in the exhaust duct, operable simultaneously to blow air in their respective directions in and out of the barn, opening means extending between said inlet and exhaust ducts for transferring air from the exhaust duct back into the inlet duct, and movable air transfer duct means mounted between said inlet and exhaust ducts, and movable in said opening means between a fresh air intake position corresponding to substantially no transfer of air between the two said ducts, and an exhaust air recycle position corresponding to substantially total transfer of exhaust air back into the inlet duct, and power operated means for moving said air transfer duct means between said two positions, and thermo-sensitive means for controlling said power operated means to move said air transfer duct means into any desired position.

Preferably the air transfer duct is an aerodynamic structure defining a curved duct back wall, and integral duct side walls so as to effectively guide air either when in the fresh air intake mode, or the exhaust air transfer mode and minimize turbulance.

More particularly, it is an objective of the invention to provide a ventilator having the foregoing advantages in which the air distribution pattern within the barn is such that it is capable of producing air circulation throughout a much greater extent of the barn area than was previously possible thereby achieving a more even regular distribution of air and avoiding concentrations of livestock at certain well ventilated positions.

More particularly, it is an objective of the invention to provide a ventilator having the foregoing advantages which is fully operable throughout a wide range of severe climatic conditions, and, in particular is not susceptible to failure due to cold weather.

It is a further and related objective of the invention to provide a ventilator having the foregoing advantages in which a substantial separation of the inlet and exhaust air streams at the exterior of the barn is achieved, thereby increasing the overall efficiency of the ventilator.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

FIG. 1 is an exploded perspective of the ventilator.
FIG. 2 is a top plan of FIG. 1;
FIG. 3 is a section along the line 3—3 of FIG. 1;
FIG. 4 is a section along the line 4—4 of FIG. 1, and,
FIG. 5 is a perspective of the air transfer duct, and,
FIG. 6 is a schematic end elevational view showing a typical air flow pattern using the ventilators.

DESCRIPTION OF A SPECIFIC EMBODIMENT

Referring now to FIGS. 1 to 4, it will be seen that the invention comrises rectangular upper and lower ducts 10 and 12, formed integrally with one another out of a common exterior rectangular wall portion 14, and an interior partition 16.

Figure 6:
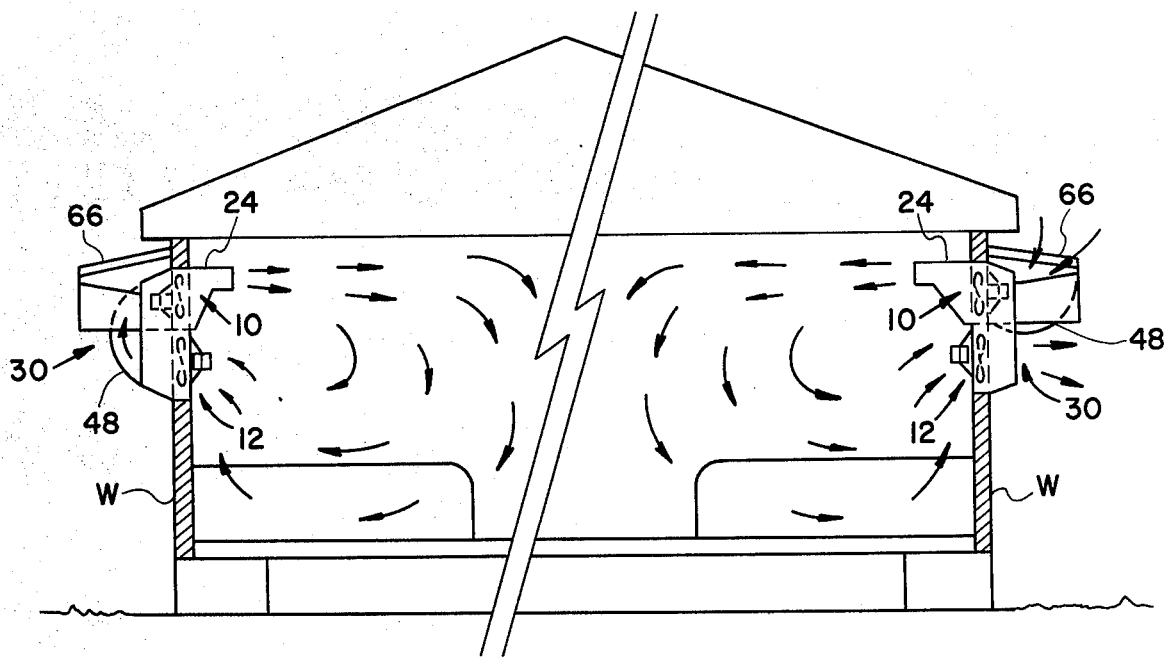

The ducts 10 and 12 are shown mounted in a typical wall W of a building (see also FIG. 6). The upper duct 10 is the fresh air inlet duct and contains an inlet fan 18 operable by any suitable electric motor, or any other power operated means, and preferably provided with some form of speed control, typically a two-speed control (not shown).

The lower duct 12 is provided with a similar fan 20 again powered typically by an electric motor, and provided with a speed control typically a two-speed control, although any other power operated means in any other form of speed control may be suitable.

The fan 18 is designed to blow air from left to right through duct 10 ie. from the exterior to the interior of a building. The fan 20 is designed to blow air right to left through the duct 12, ie. from the interior to the exterior of the building.

The duct 12, around the fan 20 is simply open so that air may be exhausted generally through the duct 12.

However, in order to procure the desired flow pattern of incoming air, the duct 10 is closed off by means of the angled lower wall portion 22, and is provided with an upper air director nozzle portion 24, having a generally arcuate shaped open mouth arranged in an essentially horizontal plane, divided by a series of guide blade members 26, the function of which is to procure a fan wise distribution of air, and also to separate the in flowing air from the air exhausting through the duct 12.

The rectangular wall portion 14 is of an appropriate width and length so as to be conveniently mounted in a rectangular opening in any typical barn wall structure, such as the wall W, and will incorporate any suitable flashing 28 so as to provide a good air tight fit.

In order to control in flowing and out flowing air at the exterior of the building, an air guide housing indicated generally as 30 is provided. In elevation the air guide housing 30 will be seen to be of generally inverted L-shaped construction and comprises side walls 32, a bottom wall 34, a back wall 36 a downwardly angled partial top wall 38 and an intermediate rear ledge 39. The interior of the housing 30 is otherwise completely open. Along the side edges 40 it is connected to the housing 14, and projects on the exterior of the barn or building. The bottom wall 34 and the lower portion of the two side walls 32 define a generally rectangular exhaust port 42. The upper portions of the side walls 32, the back wall 36 and the partial top wall 38 together define an upwardly directed air inlet port 44. Thus the exhaust port 42 will release air to the atmosphere along a generally horizontal path, and fresh air will be inducted downwardly through the inlet port 44. The interior of the housing 30 is open, and free of any fixed partitions, so that air may in fact transfer from the exhaust duct 12 up through the housing 30 and back into the inlet duct 10.

In order to control and guide such air transfer, a movable air transfer duct member 48 is provided, movably mounted within the housing 30. The air transfer duct 48 will be seen to comprise a generally curved duct back wall 50, and integral duct side walls 52 constituting an open sided scoop like structure. The duct back wall 50 in fact is somewhat flattened in its centre and curved around at each end.

It is movably supported by means of support arms 54 fastened to the duct side walls 52, and extending past the duct back wall 50 and provided with suitable pivot openings at the free ends thereof.

An air deflector panel 56 is attached to the back of back wall 50 to direct exhaust air which might otherwise attempt to flow upwardly.

Any suitable pivotal mounting means such as a rod passing through the pivot openings will be fastened to brackets 58 on the rear ledge 39 as shown. Swinging of the transfer duct 48 to and fro is controlled by means of a servomotor 60 and actuator linkage 62. The servomotor 60 is of any suitable type, typically an electrical servomotor. It will typically be controlled by any suitable thermo-sensitive control means 61 mounted in the air outlet duct 12.

Figure 1:
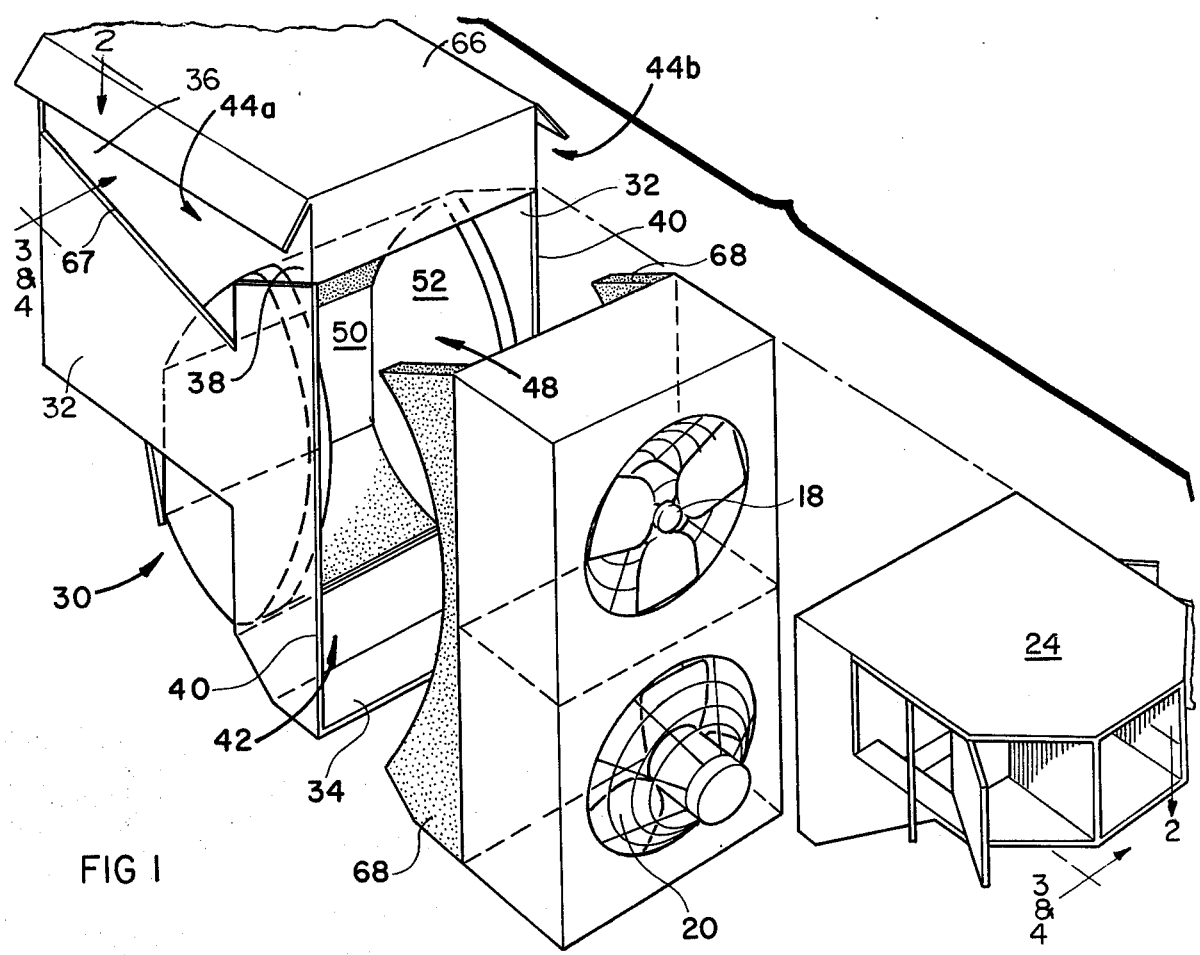
Figure 2:
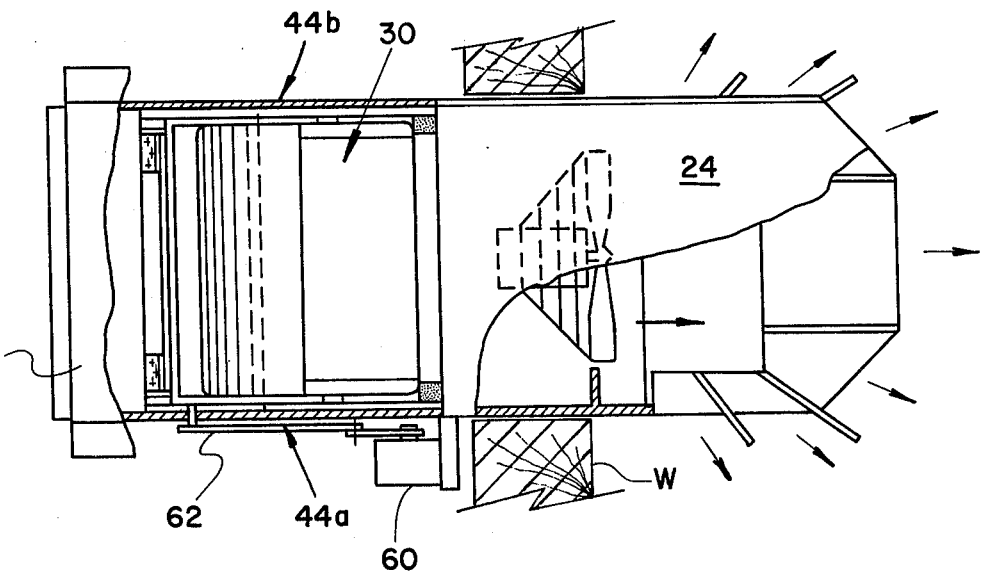
Figure 3:
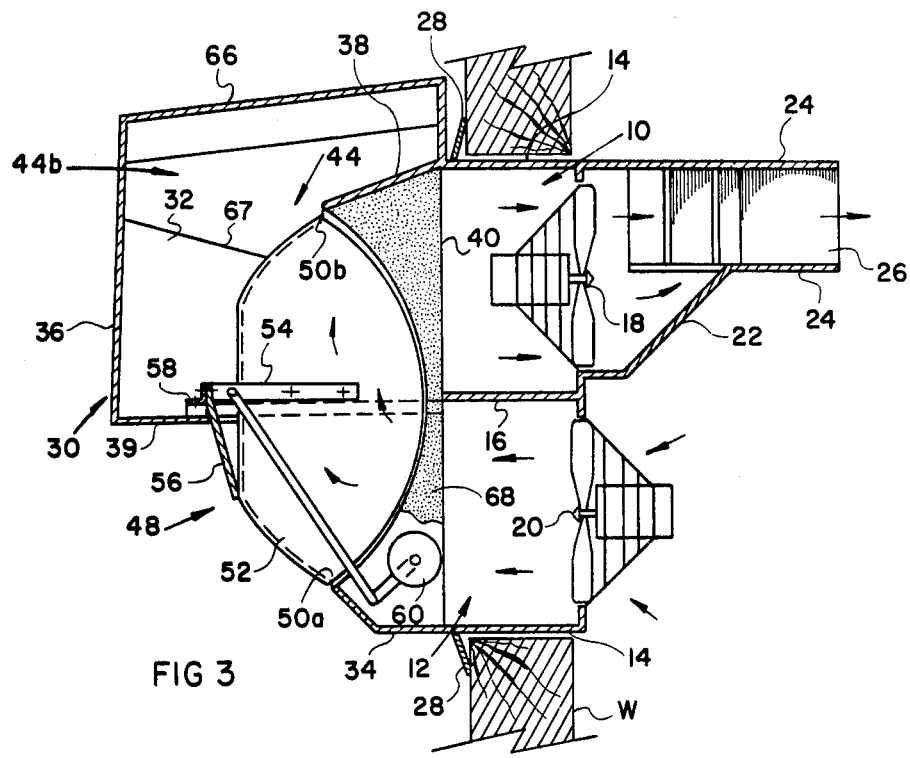
Figure 4:
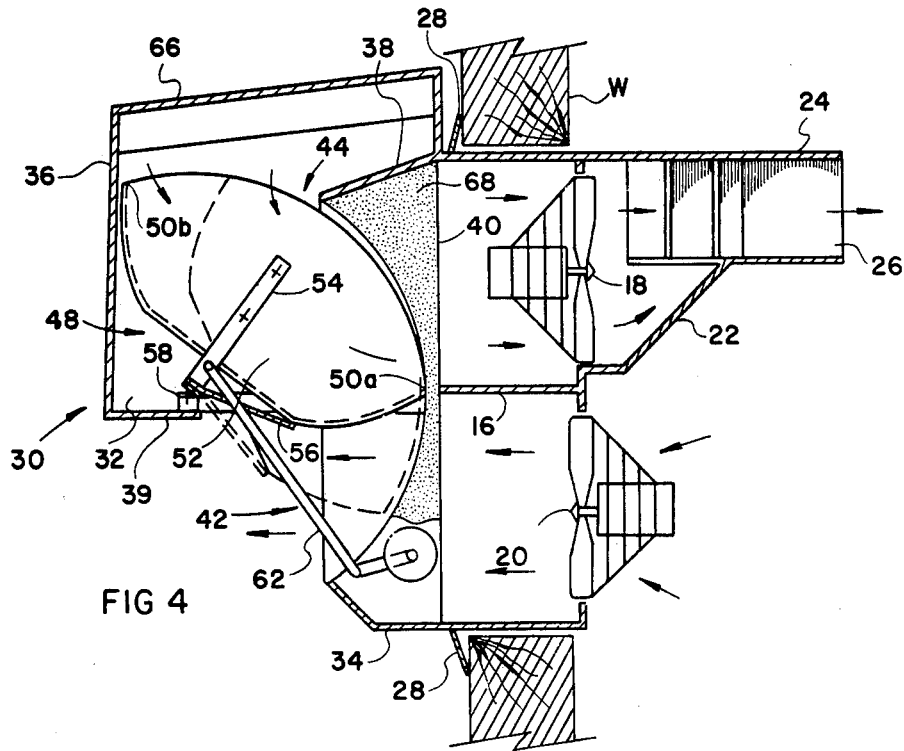
Figure 5:
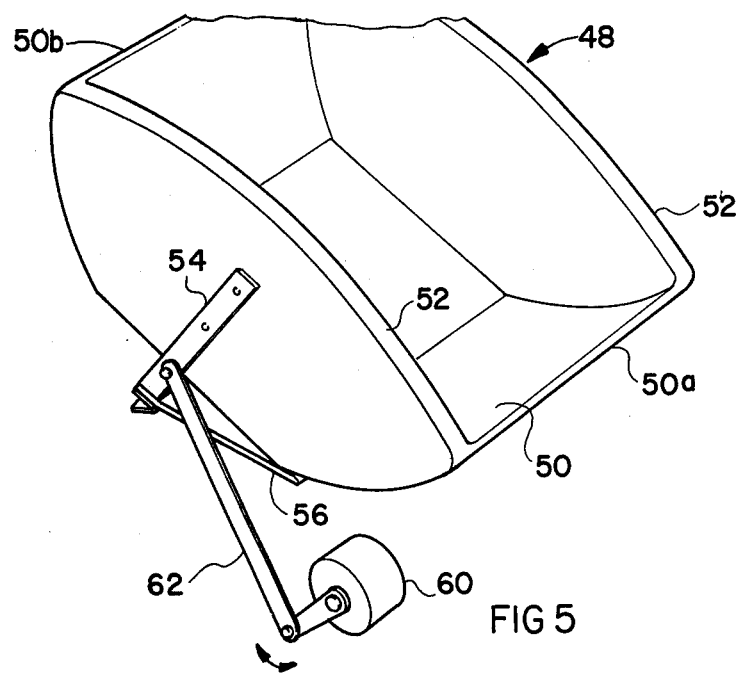

By means of the servomotor 60, the transfer duct 48 may be swung between a generally upper backwardly tilted position, and a lower more or less upright position as shown in FIGS. 3 and 4.

The transfer duct 48 is dimensioned so as to extend, when in its upper tilted position, essentially between the partition 16 in the housing 14, and the back wall 36, of the housing 30, adjacent the air inlet opening 44.

In this position, which corresponds to the maximum intake of fresh air, communication between the duct 12 and the duct 10, through the housing 30, is substantially completely cut off. The operation of the fan 18 in the duct 10 will thus draw a maximum of fresh air in through the inlet port 44. Similarly, operation of the exhaust fan 20 will draw stale air out of the building and exhaust it directly out through the exhaust port 42 which is fully open and unobstructed.

Assuming however that the air temperature of the in coming air is too cold then it will be desirable to somewhat restrict the air in flow through the duct 10, and to transfer some of the exhaust air from the duct 12 back into duct 10 thereby maintaining a somewhat higher temperature within the building. The servomotor 60 is thus operated to swing the transfer duct 48 into a more nearly upright position. As it does so, the lower edge 50a of the duct wall 50 will intrude upon the exhaust port 42, and the upper edge 50b of the duct wall 50 will gradually close off the air intake opening 44. The operation of the exhaust fan 20 and the inlet fan 18 will however continue and accordingly some air from the exhaust duct 12 will be caught by the air transfer duct 48 and will be redirected back into the air inlet port 10 and recycled back into the interior of the building. However, at this intermediate position some additional fresh air will be drawn in, and some of the stale air will be exhausted.

In theory, it is possible for the servomotor 60 to swing the air transfer duct 48 into a substantially upright vertical position. In this position it will entirely shut off the exhaust opening 42, and it will also substantially close off access between the inlet port 44 and the inlet duct 10. Thus substantially all of the air being exhausted by the fan 20 will be caught by the air transfer duct 48 and recycled back into the inlet duct 10.

In practise however this extreme mode of operation is unlikely to continue for any length of time. It would produce a substantial increase in the barn temperature in the majority of cases, due to the body heat given off by the animals.

It would also substantially restrict the in flow of fresh air and might tend to produce harmful results if continued for any length of time. In practise therefore in extremely cold weather the farmer will usually incorporate some additional form of space heaters in the barn to maintain a suitable temperature. Thus the air transfer duct 48 will for all practical purposes never be operated in the total air recycle position, but will more or less always be in some intermediately tilted position. Of course, in extremely hot weather the air transfer duct will operate substantially all day in the rearwardly tilted position with maximum fresh air intake and maximum exhaust, only moving into a slightly more upright tilted position as the temperature cools down at night.

In order to avoid entry of rain, snow or the like into the inlet port 44 some suitable covering or hood 66 is provided which is supported in any suitable manner spaced above the inlet port 44. Cut out wall portions 67, are formed in side walls 32 and together with the hood 66, define two inlet passages 44a and 44b directed to either side of the unit.

Depending upon the weather conditions which the unit is expected to encounter, it will be provided with suitable thermal insulation such as panels 68, or any other thermal insulation eg. polyurethane foam, at various points to avoid build up of ice on the colder metal parts which might otherwise occur from the humidity in the exhausted air for example.

As best shown in FIG. 6, quite large barns can be ventilated by the provision of air ventilation units in accordance with the invention in opposite side walls W.

For the sake of example, one ventilator in FIG. 6 is shown with the transfer duct 48 vertical, in the fully recycled position, and in the other ventilator the duct 48 is almost horizontal, in the fully open position. This would not of course represent a normal working condition at all. In most cases the ventilators will all operate with their ducts 48 in positions which are fairly close to one another.

The fresh air intake is directed across the upper portion of the building, and, will then flow downwardly, more or less in the center of the building and eventually be returned through the exhaust duct in the air flow pattern shown in arrows. It will thus be seen that a substantial degree of continuous ventilation can be maintained in virtually the entire space occupied by animals within the building. Thus animals will not tend to congregate in any particular portion of the building.

By the use of a suitable thermal control 61 and a similar control 70 for the operation of the fans 18 and 20, it is thus possible to provide for ventilation and temperature control over quite a wide range of varying climatic conditions. In fact, it has been found possible in accordance with the invention to set a desired air temperature, on the thermal controls and have that temperature maintained within a fluctuation of one to two degrees between night-time and day-time. Such an accurate degree of the temperature control has never been achieved before with typical barn ventilation systems. Substantial savings can thus be achieved by farmers where the health of livestock is greatly improved, and the rate of weight gain is maximized.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A ventilator adapted for wall mounting for use in ventilating building such as agricultural buildings used for housing livestock and the like, said ventilator comprising;

upper inlet duct means;

lower outlet duct means, said upper and lower duct means being located with said upper duct means immediately above said lower duct means;

intake fan means communicating with said upper duct means;

exhaust fan means communicating with the said outlet duct means;

outer housing means communicating with both said upper and lower duct means, and dimensioned to extend outwardly from the exterior of said wall;

junction wall portions on either side of said outer housing means, having edges formed into a concave arcuate shape;

upper inlet opening means in said outer housing means for admission of fresh air thereinto;

lower exhaust outlet means for the exhausting of exhaust air therefrom;

transfer duct means swingably mounted within said outer housing means for swinging between upper and lower positions and having a back wall portion having upper and lower ends, curved inwardly in a crescent shaped manner, and duct side wall means attached to either side of said back wall constituting the same into a three-sided generally scoop shaped member, said side wall members having free edges formed into a convex arcuate shape corresponding substantially to said concave arcuate shape of said junction wall portions to provide for free air flow between said junction wall portions and said transfer duct means, said transfer duct means when in said upper position transferring fresh air from said intake opening directly into said inlet duct means, and said transfer duct means when in said lower position transferring exhaust air from said outlet duct means back into said inlet duct means and, controllable power operated means connected with said transfer duct means for swinging same between its two positions, and being adapted to locate said transfer duct means in any one of a number of intermediate positions between said upper and lower positions.

2. A ventilator as claimed in claim 1 wherein said upper and lower duct means comprise a common generally rectangular housing, and partition means extending thereacross dividing said housing, into upper and lower compartments, the upper compartment comprising said upper inlet duct means and the lower compartment comprising said lower outlet duct means.

3. A ventilator as claimed in claim 2 wherein said outer housing means is of a generally inverted L-shape in elevation, defining an upper longer housing portion and a lower shorter housing portion, the upper housing portion having a closed vertical end wall, and an opening means cut in both side walls thereof, and defining an upwardly directed inlet opening, and including hood means fastened over said inlet opening, and spaced thereabove whereby to prevent entry of rain or the like into said upwardly directed inlet opening.

4. A ventilator as claimed in claim 3 wherein said upper housing portion includes a generally horizontal wall portion extending from one side wall to the other, adjacent said back wall, and wherein said transfer duct means is hingeably mounted on said horizontal wall portion, and including baffle plate means located on the outer side of said transfer duct means, and partially overlapping said horizontal wall portion.

5. A ventilator as claimed in claim 4 wherein said junction wall portions of said outer housing means include panels of thermal insulation material, formed into said arcuate shape.

* * * * *